Nov. 9, 1971　　　　TAIICHI AKIYAMA　　　　3,618,489
AUTOMATIC EXPOSURE TIME CONTROL FOR CAMERAS
Filed June 24, 1970　　　　　　　　　　　　2 Sheets-Sheet 1
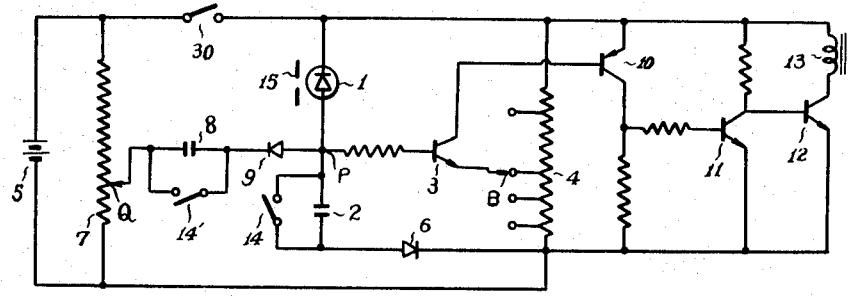
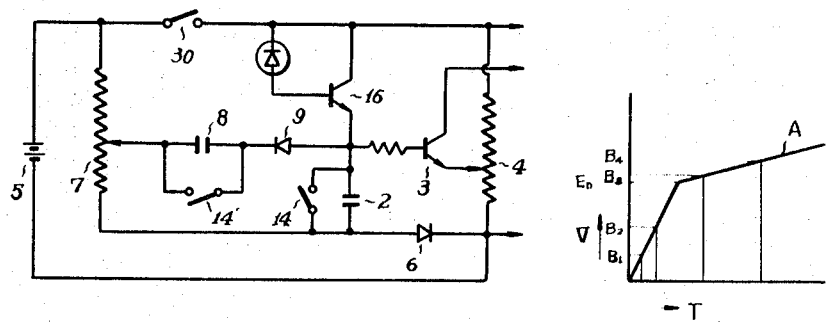
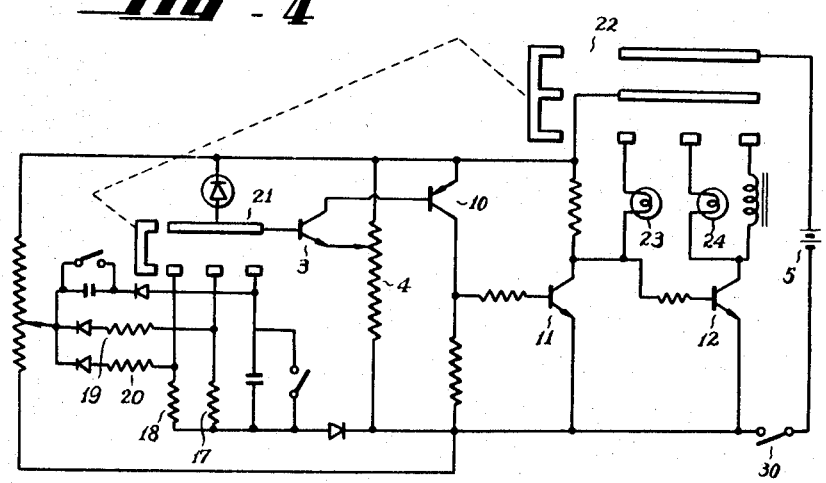
INVENTOR
TAIICHI AKIYAMA
BY Steinberg & Blake
ATTORNEYS

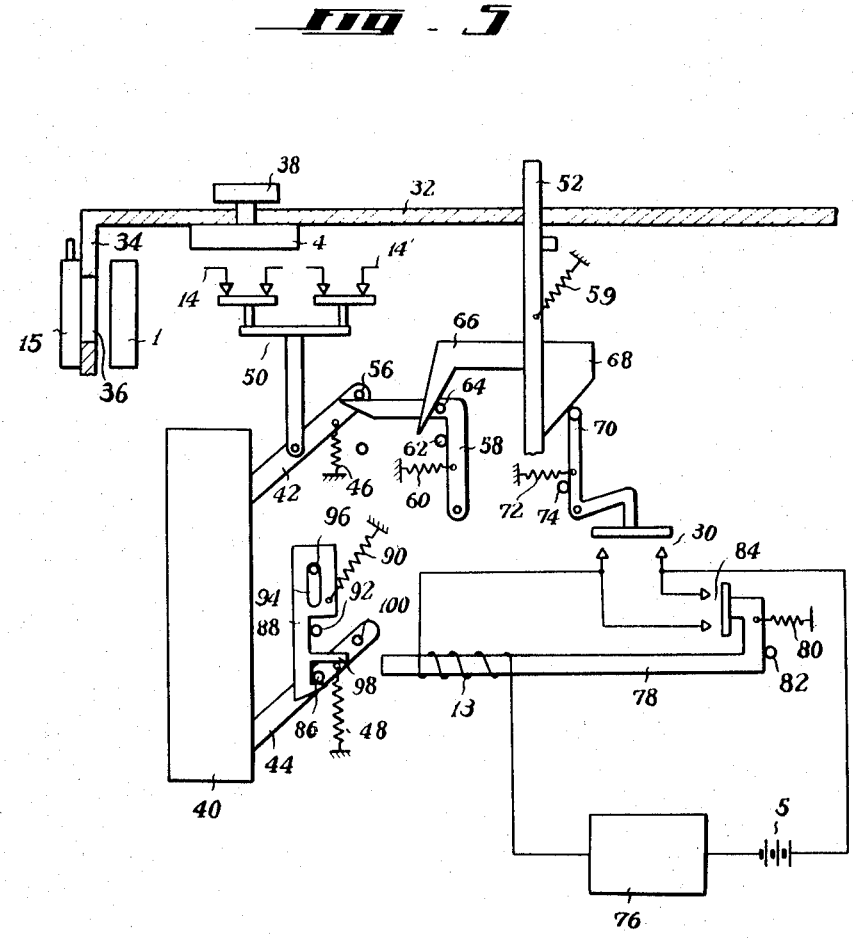

United States Patent Office 3,618,489
Patented Nov. 9, 1971

3,618,489
AUTOMATIC EXPOSURE TIME CONTROL FOR CAMERAS
Taiichi Akiyama, Okayashi, Japan, assignor to Kabushiki Kaisha Yashica, Tokyo-to, Japan
Filed June 24, 1970, Ser. No. 49,422
Claims priority, application Japan, June 30, 1969, 44/51,946
Int. Cl. G03b 7/04, 9/62
U.S. Cl. 95—10 C    10 Claims

ABSTRACT OF THE DISCLOSURE

An apparatus for automatically determining exposure time in a camera which has a shutter which is opened to start an exposure and closed to terminate the exposure. A photosensitive element and a timing capacitor are connected in series to form a timing circuit with the charging of the timing capacitor taking place according to the intensity of light impinging on the photosensitive means. A switching circuit is triggered by the trigger voltage which forms the output of the timing circuit, and an automatic shutter-closing mechanism is actuated by the switching circuit to close the shutter and terminate the exposure when the trigger voltage of the timing circuit is reached. The voltage with which the timing capacitor is charged continuously increases as time elapses, and after a given voltage level is reached a voltage regulator responds automatically to this level for reducing the rate at which the voltage at the timing capacitor increases.

BACKGROUND OF THE INVENTION

The present invention relates to cameras.

In particular, the present invention relates to cameras which are capable of automatically determining the exposure time.

As is well-known, cameras of this latter type include photosensitive elements which respond to the light intensity for determining exposure time in accordance with the light intensity. Of course, the exposure time is also determined in accordance with other factors such as the setting of the camera diaphragm and the film speed.

It is possible to provide a photosensitive element in the form of a photoconductor which includes a cadmium sulfide element on which the light impinges for introducing the factor of light intensity into the structure which automatically determines the exposure time. A photosensitive element of this latter type is indeed of advantage in that a relatively great photoconductive output can be achieved. However, such photoconductors are undesirable in that when making exposures with substantially instantaneous flash illumination, it is impossible to achieve proper operation with such a photoconductor due to the fact that it responds to light at a speed which is too slow.

It has been proposed to use instead of such a photoconductor, a photosensitive means in the form of a phototransistor which has a higher speed of response to light, as contrasted with cadmium sulfide. Photosensitive elements of this latter type, however, generally have a constant current characteristic providing an output which depends on the intensity of light impinging on such a photosensitive element while being independent of the voltage applied thereto. Therefore, in a CR timing circuit comprising a photoelectric output circuit under the control of such a photosensitive element of photoelectromotive nature and a capacitor connected in series with the photoelectric output circuit, the terminal voltage of the capacitor will rise in direct proportion to the time which has elapsed.

Among the exposure-determining factors in a camera, for automatically determining a proper exposure time with an automatic exposure time control system, there are not only the factor of light intensity but also the factor of the speed of the film which is exposed and the setting of the diaphragm aperture. Thus, the circuitry must be adjusted to take into account these latter factors as well as the light intensity in order to provide a proper determination of the exposure time. Thus, the trigger level of a transistor switching circuit which utilizes the output of a timing circuit of the above type which includes a light sensitive element of photoelectromotive nature as the trigger voltage must be adjustably set also in accordance with the exposure-determining requirements other than light intensity so that these other factors will also be accounted for in a proper determination of the exposure time. These additional factors require the trigger level to be changed at different settings of the several exposure-determining factors in such a manner that the voltage of the trigger level is a multiple of the trigger voltage of the timing circuit which is in turn directly proportional to the elapsed time. Therefore, a switching transistor of the switching circuit should have an emitter resistance which can be varied according to the adjustment requirements for the trigger level with the values of emitter resistance being varied according to a given series of multiples of settings for this resistance. In the electrical circuitry of such an apparatus, however, the minimum trigger level of the switching transistor is determined by the characteristics of the transistor itself while the maximum trigger level thereof is determined by the voltage source, and it is not possible to use a relatively high voltage source, so that the adjustable range of the emitter resistance values cannot include more than three or four settings when the emitter resistance value is increased according to a given series of multiples. For practical purposes, operation of a camera based upon these factors requires 10 settings for the different exposure multiples. When utilizing, however, a light-sensitive element of photoelectromotive nature in the timing circuit, as the light sensitive element for the automatic exposure time control assembly, a practical operation cannot be achieved with a circuit where such a photosensitive element is only coupled with a timing capacitor.

Considering the time adjusting operation of a switching circuit which uses the output of a CR timing circuit as its trigger voltage, the operating point of the switching circuit at the trigger voltage which has risen relative to the established trigger level as time has elapsed is not necessarily of greater accuracy. Particularly in the case of smaller exposure time values or high-speed shutter controls, there is an error in the exposure time adjustment. In order to reduce such an operating error of the switching circuit to a minimum, the speed per second with which the trigger voltage rises must be higher.

As was pointed out above, there are various requirements for control of exposure time with an automatic exposure time control apparatus of a camera, and particularly when the light-sensitive element utilized is of a photoelectromotive nature, an improvement in the higher operating level is required so that the exposure time adjustment is possible with synchronized photography as a result of the quick light-response of the light-sensitive element as well as the photographic requirement of exposure-determining factors other than light intensity which must be introduced into the circuit for achieving a proper time adjustment.

SUMMARY OF THE INVENTION

It is accordingly a primary object of the present invention to provide a structure which will avoid the above drawbacks.

In particular, it is an object of the invention to provide a control system which can take advantage of the rapid light response of a photosensitive means while at the same time making it possible to introduce a much larger number of settings for values of factors different from light intensity than has heretofore been possible.

It is particularly an object of the invention to provide an exposure-time control capable of being effectively adjusted with a relatively large number of settings for factors such as film speed or diaphragm aperture, without sacrificing the advantages of rapid light response.

In addition, it is an object of the invention to provide a construction of this type which will achieve a high degree of accuracy at a low manufacturing cost.

Furthermore, it is an object of the invention to provide a construction of this type which does not require extremely expensive diaphragm mechanisms.

Also, it is an object of the present invention to provide a construction which will achieve the desired results with a maximum effectiveness of the light-responsive element so that proper exposures can be achieved even under conditions of relatively low light.

Furthermore, it is an object of the invention to provide a structure which lends itself to use with various types of circuits such as circuits which include suitable amplifiers or circuits which include warning indicators for indicating when the lighting conditions are below or above a given range of light intensity where proper exposures can be made.

It is, in particular, an object of the invention to provide a construction which will operate automatically to reduce the rate of voltage increase in the charging of a timing capacitor above a given voltage level so that with such a reduced rate of voltage increase it becomes possible to reduce increments between settings of a control resistor while increasing the number of settings.

In accordance with the invention, the automatic exposure time controls include a photosensitive means and a timing capacitor connected in series therewith to form a timing circuit with the photosensitive means. This timing capacitor will be charged according to the output of the photosensitive means which in turn responds to the light intensity. The timing circuit provides an output in the form of a trigger voltage used for triggering a transistor switching circuit which is operatively connected with a means for terminating an exposure by closing a shutter which was previously opened to start the exposure. Thus, the instant of closing of the shutter and termination of the exposure, or in other words, the duration of exposure time, is determined according to the trigger voltage of the timing circuit output which through the switching circuit will actuate the structure which closes the shutter. Operatively connected with the timing circuit is a second capacitor which has a reversely biased diode connected in series therewith, this second capacitor being connected in parallel with the timing capacitor. The reversely biased diode operates automatically to connect the second capacitor into the circuit only after a predetermined voltage at the timing capacitor is reached, so that at voltages higher than this latter predetermined voltage the rate of voltage increase will be reduced because of the connection of the second capacitor into the circuit by the reversely biased diode.

BRIEF DESCRIPTION OF DRAWINGS

The invention is illustrated by way of example in the accompanying drawings which form part of this application and in which:

FIG. 1 is a basic wiring diagram of the structure of the invention;

FIG. 2 is a wiring diagram of a further embodiment of a control system of the invention;

FIG. 3 is a graph illustrating the manner in which trigger voltage increases with elapse of time;

FIG. 4 is a wiring diagram of another embodiment of the invention; and

FIG. 5 is a schematic illustration of the manner in which the structure operates.

DESCRIPTION OF PREFERRED EMBODIMENTS

Referring now to the drawings and to FIG. 1 in particular, the structure illustrated therein includes a photosensitive means in the form of a photodiode 1 which serves as a light-responsive element which provides an electrical output in response to impingement of light on the photodiode. This photosensitive means 1 forms, together with a timing capacitor 2, a timing circuit. The timing capacitor 2 is connected in series with the photosensitive means 1. In this way, these components form a CR timing circuit. The output of the timing circuit forms a trigger voltage for triggering a switching circuit which includes a switching transistor 3. The capacitor 2 and photosensitive means 1 are connected to each other at a junction P, and through a suitable resistor the base of the transistor 3 is connected also with the junction P. In the switching circuit there is a variable resistor 4 which forms the emitter resistor for the switching transistor 3. This variable resistor 4 has a number of settings one of which is selected according to a particular exposure-determining factor other than light intensity. For example, the variable resistor 4 may be set according to the speed of the film which is exposed in the camera, or it may be set according to the size of the exposure aperture which is selected by setting of the diaphragm of the camera.

The circuit includes a power source 5 as well as a switch 30 for closing and opening the entire circuit. A diode 6 is forwardly connected with respect to the power source 5 for the illustrated circuits and is inserted between the negative pole of timing capacitor 2 and the negative pole of the emitter resistor 4 in such a way that forward voltage across the base and emitter of transistor 3 is negated.

In the illustrated circuit of the invention, a second capacitor 8 is connected in parallel with the timing capacitor 2. A reversely biased diode 9 is connected in series with the second capacitor 8, and the series-connected components 8 and 9 are also connected electrically to the timing circuit at the junction P. These components 8 and 9 form a voltage-regulating means as will be apparent from the description which follows. This voltage-regulating means regulates the voltage in such a way that when the voltage at the capacitor 2 rises above a predetermined level, the rate of voltage increase is reduced. An adjusting means is provided for adjusting the predetermined voltage above which the rate of voltage increase is reduced, and this adjusting means includes the variable resistor formed by the bleeder resistor 7 for the power source 5 and a slider Q forming an output terminal for the variable resistor 7 and connected to the second capacitor 8 in the manner illustrated. Thus, the reversely biased diode 9 and the series-connected capacitor 8 are connected in parallel with the timing capacitor 2.

In addition to the switching transistor 3, the switching circuit includes a transistor 10 to the base of which the collector of transistor 3 is connected. The collector voltage of transistor 10 is applied to the base of a further transistor 11 which is followed by a transistor 12 with all of these transistors and additional components constituting a well-known switching circuit providing an electrical control for energizing and de-energizing the electro-magnet 13 which brings about closing of the shutter in a manner described below when the electromagnet or solenoid 13 is de-energized.

Synchronized switches 14 and 14' are respectively connected in parallel with the capacitors 2 and 8 so as to bypass the latter when the switches are closed, and these switches 14 and 14' are arranged so as to be opened in synchronism with opening of the shutter.

In the path of light which travels to the photosensitive means 1 so as to impinge thereon is situated an iris diaphragm 15 which can be adjusted so as to provide an aperture of selected size through which the light travels to reach the photosensitive means 1. This diaphragm 15 is adjusted by the operator in accordance with an exposure-determining requirement other than light intensity such as the setting of the diaphragm at the objective of the camera or the film speed.

The embodiment of the invention which is illustrated in FIG. 2 is similar to that of FIG. 1. The unillustrated structure situated to the right of the resistor 4 shown in FIG. 2 is identical with the structure shown to the right of the resistor 4 in FIG. 1. The embodiment of FIG. 2 differs from that of FIG. 1 only in that the timing circuit includes an amplifier transistor 16 to which the output of the photosensitive means 1, in the form of the photodiode, is applied. Thus, it will be seen that the output of the photodiode 1 is applied to the base of the amplifier transistor 16, and this transistor is connected between the junction P and the photosensitive means 1. Otherwise, the structure of FIG. 2 is the same as that of FIG. 1.

FIG. 3 is a graph according to which a timing curve A of the timing circuit is plotted with voltage V along the ordinate being plotted against time T along the abscissa. The various voltage values $B_1$, $B_2$, $B_3$, $B_4$ designate the emitter voltage or trigger lever of the transistor 3 while the voltage $E_D$ designates the voltage at the output terminal Q of the bleeder resistor 7. Thus, it is this latter voltage which is the predetermined voltage above which the rate of voltage increase is reduced, as will be apparent from the description below.

In the embodiment of the invention which is illustrated in FIG. 4, a warning means is included for indicating to the operator when the lighting conditions are above or below the range of light intensity at which proper exposures can be made. This embodiment includes a diagrammatically illustrated change-over switch 21 which can be operated for successively and selectively inserting into the circuit a resistor 17 for detection of the lowest light intensity limit and a resistor 18 for detection of the highest light intensity limit, both of these resistors being inserted in a manner replacing the timing capacitor 2 as an automatic adjustment for the warning or alarm means and the circuit includes resistors 19 and 20 which can be inserted into the circuit together with the resistors 17 and 18 to replace the capacitor 8. In addition, in this circuit there is a second change-over switch which is operatively connected with the change-over switch 21 and which functions to insert into the circuit a lamp 23 which becomes illuminated to give warning that the light is below the lowest light intensity limit and a lamp 24 to give a warning when the lamp 24 is illuminated for indicating that the light intensity is above the highest light intensity limit, these lamp circuits beng introduced into the collector circuit of the transistor 11 and the collector circuit of the transistor 12, respectively.

FIG. 5 diagrammatically illustrates a camera housing 32 provided at its front wall 34 with the opening 36 through which the light reaches the photosensitive means 1. Mounted on the camera wall 34 in front of the opening 36 is the adjustable diaphgram 15 which can be set by the operator at a value corresponding, for example, to the setting of the diaphragm at the objective of the camera. The top wall 32 of the camera carries the variable resistor 4 which is operated by a manually accessible knob 38 which has an index coacting with a suitable scale so that the resistor 4 can be set at a selected value. These settings at which it is possible to manually set the resistor 4 may, for example, be settings of different film speeds, matching the speed of the film which is introduced into the camera to be exposed therein.

The camera includes a shutter 40 which is diagrammatically illustrated. The shutter is operated by way of a pair of levers 42 and 44. These levers are capable of being turned to the illustrated position during the cocking of the shutter in a well-known manner which forms no part of the present invention. A spring 46 is connected with the lever 42 to urge the latter to a given rest position which opens the shutter to start the exposure. A spring 48 urges the lever 44 to turn to a given rest position so as to close the shutter and terminate the exposure. It will be noted that through a suitable linkage 50 the lever 42 is connected with the switches 14 and 14', so that the latter switches automatically, open upon opening of the shutter, in synchronism with the shutter opening. These switches 14 and 14' are, of course, closed when the shutter is cocked.

When the shutter is to be tripped so as to make an exposure, the operator will depress the shutter-operating plunger 52. This plunger is urged upwardly to a given rest position by a spring 59.

When the shutter is cocked, a pin 56 on the lever 42 snaps over a releasable holding lever 58 urged by a spring 60 against a stop 62. This lever 58 carries a pin 64 engaged by a camming edge of a cam 66 which is connected to the plunger 52 for downward movement therewith.

The plunger 52 carries a second cam 68 which has a camming edge engaging a switch-operating lever 70 urged by a spring 72 against a stop 74. This lever 70 functions to close the switch 30 during the downward movement of the plunger 52. This will, of course, close the circuit in any of the embodiments described above. The control circuit 76 represents any one of the circuits of FIGS. 1–4.

Thus, the closing of the switch 30 will result in energizing of the solenoid 13 with the result that the armature 78 thereof will be moved in opposition to the spring 80 which urges the armature to a rest position engaging the stop 82. The energizing of the solenoid 13 will result in closing of a switch 84 so that the control circuit will remain closed even after the operator releases the plunger 52.

When the shutter is cocked, a pin 86 on the lever 44 snaps behind the lower hook-shaped portion of a releasable holding lever 88 urged upwardly by the spring 90 which also holds the lever 88 against a pin 92. The lever 88 is formed with an elongated slot 94 through which the pivot 96 extends, so that in this way the lever 88 can move upwardly as well as swing about the pin 96.

The lever 88 has an extension 98 situated in the path of movement of the armature 78 of the solenoid 13 so that when the latter is energized, the lever 88 is turned so as to release the pin 86. However, the spring 48 still cannot move the lever 44 down since the armature 78 first moves beneath a second pin 100 of the lever 44, before releasing the lever 44 at the pin 86, and thus it is the solenoid itself which now holds the lever 44 in a cocked position. Therefore, it is only when the solenoid 13 becomes unenergized that the spring 80 will retract the armature 78 so as to release the lever 44 to the spring 48 which can then close the shutter.

The above-described structure operates as follows:

When the plunger 52 is depressed, the cam 68 will first act through the lever 70 so as to close the switch 30 and thus energize the control circuit. Therefore, the circuit is closed immediately prior to opening of the shutter. The cams 66 and 68 are so arranged that switch 30 will close prior to retraction of lever 58 away from the pin 56. Thus, the synchronized switches 14 and 14' are both closed just prior to opening of the shutter. Also, at this time the transistors 3, 10, and 11 of the switching circuit are in a non-conductive state, while the transistor 12 is in a conductive state, so that upon closing of the switch 30 the electromagnet 13 is energized and functions through its armature 78 to maintain the lever 44 in the cocked position, preventing the closing of the shutter, as is apparent from the above description.

The continued depression of the shutter-actuating plunger 52 will then retract the lever 58 away from the pin 56, so that now the spring 46 can act on the lever 42 in order to swing the latter so as to open the shutter and simultaneously open the switches 14 and 14', thus starting the exposure. In this way the switches 14 and 14' are opened in synchronism with the starting of the exposure and the charging of the timing circuit. The timing capacitor 2 will therefore begin to become charged with the photoelectric current determined in accordance with the intensity of the light impinging on the photodiode 1, and thus the timing capacitor is under the control of the photodiode 1. When the voltage at the junction P has risen, during a lapse of time, to an emitter voltage such as, for example, the voltage $B_1$, determined by the resistance value at which the emitter resistor has previously been set in accordance with the exposure-determining factors other than light intensity, the switching transistor 3 will respond to the predetermined trigger voltage at the output of the timing circuit so as to transfer from the non-conductive to the conductive state, thus rendering the transistors 10 and 11 also conductive and placing the transistor 12 in a blocking or nonconductive condition. The result is that the electromagnet 13 becomes unenergized and the spring 80 functions to release the lever 44 so that it can be displaced by the spring 48 to the position at which the shutter is again closed to terminate the exposure, and at the same time the switch 84 is opened so as to open all the circuits with all of the parts returning to their rest positions.

With the above-described automatic exposure time control, the voltage $E_D$ at the output terminal Q of the bleeder resistor 7 is established so as to be higher than the adjusted, preselected voltage $B_1$ of the emitter resistor 4, and since the diode 9 is reversely biased by the voltage $E_D$ during the operation, there will be no transmission of current across the diode 9 and the controls take place in the same way as they would if only the timing circuit operated by itself.

However, in the case where the adjusted voltage of the emitter resistor 4 has been set at a resistance value according to which the photographing requirements call for a voltage higher than the voltage $E_D$, such as, for example, a voltage $B_4$, then the voltage at the junction P of the timing capacitor which has begun to be charged will rise above the voltage $E_D$, and as soon as the trigger voltage rises above this predetermined level, the photoelectric current is transmitted through the diode 9, now released from its reverse bias, so as to reach the capacitor 8 also. As a result, above the predetermined voltage level $E_D$ the electric current which is charged into the timing capacitor 2 is greatly reduced.

This operation is apparent from FIG. 3 where the rate at which the voltage increases per second at the junction P after the predetermined voltage $E_D$ is reached is reduced as illustrated by the curve A. When the voltage at the junction P, the trigger voltage, reaches the emitter voltage $B_4$ (the triggering level), after the rate of voltage increase per second has been reduced, there will again take place the reversing operation of the switching transistors 3, 10, 11 and 12 in the manner described above and the shutter will be automatically closed. The resistance value of the emitter resistor 4 is set in accordance with the particular requirements for making the desired photograph, and the adjustments may be set with respect to variation of trigger voltage after the speed of increase of the voltage has been reduced.

It is apparent, therefore, that the resistance values at which the emitter resistor may be set may be according to increments in a series of multiples within a range of emitter voltages $B_1$, $B_2$ below the predetermined voltage $E_D$ and within given increments of resistance value above the latter voltage, with the increments below the voltage $E_D$ being greater than those above the voltage $E_D$ so that the progressively smaller differential from one increment to the next in the settings above the voltage $E_D$ will give the possibility of a greater number of settings at this particular range of adjustment. It is therefore possible with the invention to provide a greater number of settings for factors in addition to light intensity within the limited adjustment range of the resistance values of the emitter resistor 4.

The apparatus according to the invention may also be used with a timing circuit, as shown in FIG. 2, where the photoelectric output of the photodiode 1 is amplified, as by the amplifier transistor 16. Thus, with the embodiment of FIG. 2 the same effect is achieved as that of FIG. 1 except that the photoelectric output of the photodiode 1 is amplified by the amplifier transistor 16 and the timing capacitor 2 is charged with the amplified output. In addition, in this embodiment the amplifier transistor 16 has a tendency to be dependent upon the voltage in its amplifying effect, so that the resistance value of the emitter resistor 4 may be set at increments of equal difference within the range of emiter voltage below the voltage $E_D$ while the resistance value may be set at increments of progressively smaller magnitude within the range of emitter voltage higher than the voltage $E_D$. Such an arrangement has proved to be more effective than any conventional arrangement for introducing into the circuit exposure-determining factors other than light intensity.

As may be seen from FIG. 4, if the apparatus of the invention is used with an arrangement which includes an automatic adjustment limit warning means of a well-known type, the fixed resistor for detection of the limits of illumination is connected in the manner of changeover with the timing capacitor 2 and a lamp can be illuminated to provide a warning or alarm in a predetermined manner, with the structure being connected into the circuit in such a way that the resistors 19 and 20 replace the capacitor 8 and may be added together with the known warning means to indicate the limits of possible photographic operations through the warning system which is in itself well-known.

As is apparent from the above description, the apparatus of the invention is arranged in such a way that the additional capacitor 8 is connected in parallel with the timing capacitor 2, with the reversely biased diode 9 in series with the capacitor 8, so that factors other than light intensity may easily be introduced into the structure in a convenient multi-step manner to provide for the exposure time a control under the desired range of variation for the values of the triggering level, providing in this way an automatic exposure time control apparatus which is very practical.

With conventional arrangements, the addition of factors other than light intensity is accomplished, for example, by adjustment of a diaphragm aperture of an iris diaphragm which is disposed in the path of light travelling to the photosensitive element. Such diaphragm mechanism has required the highest degree of precision in its manufacture since the smallest diaphragm aperture is required to have an extremely small area. This results in high costs and operations which are not always as precise as desired. In contrast, with the invention, the addition of the exposure-determining factors other than light intensity is brought about by electrical structure so that without sacrificing precision, it is possible to manufacture the apparatus of the invention at a far lesser cost while achieving a high degree of efficiency and precision in the operation.

Moreover, with the structure of the invention, the triggering level is set through a relatively wide range and there is no particular limit on the light which impinges on the photosensitive means, so that it becomes possible with the structure of the invention to carry out automatic exposure controls even under conditions where the object to be photographed is in very little light with the light impinging on the photosensitive means being of the minimum intensity required for an effective response of the photosensitive means to the light. Therefore, with the strucuture of the invention it becomes possible to provide a range of light intensity from the object to be photographed which is extremely great while at the same time maintaining the advantages of automatic exposure time determination.

It is, of course, apparent that the apparatus of the invention can also be used with a timing circuit which uses a photoconductor. Also, it is to be noted that the diagrammatically illustrated features of FIG. 5 are provided only to show one of many different possible arrangements. The invention can be used with many types of shutters and with many different types of controls. The diaphragm 15 may be set according to the diaphragm settings at the objective of the camera, in which case the variable resistor 4 is set according to film speed, or a reverse arrangement may be used with the variable resistor 4 set to a value corresponding to the setting of the diaphragm at the objective while the diaphragm 15 is set according to film speed.

Thus, with the structure of the invention, it becomes possible to use for the photosensitive means 1 an element which will respond very quickly to light while at the same time it becomes possible to introduce into the control circuit a number of different settings for exposure-determining factors other than exposure time far beyond what has heretofore been possible.

What is claimed is:

1. In an apparatus for automatically controlling exposure time in a camera which has a shutter which is opened to start an exposure and closed to terminate an exposure, photosensitive means and a timing capacitor connected in series therewith for forming with said means a timing circuit providing a trigger voltage, said photosensitive means responding to the intensity of light received thereby for charging said capacitor with a voltage which increases as time elapses, thus increasing the trigger voltage of the output of the said timing circuit, switching circuit means operatively connected with said timing circuit to receive said output voltage thereof and shutter-closing means operatively connected with said switching circuit to be actuated thereby for closing a shutter of the camera to terminate an exposure when said switching circuit responds to a given trigger voltage, and voltage-regulating means operatively connected with said timing circuit for automatically reducing the rate at which the charging voltage of said capacitor increases in response to the latter voltage reaching a predetermined level.

2. The combination of claim 1 and wherein said voltage-regulating means includes a second capacitor connected in parallel with said timing capacitor and a reversely biased diode connected in series with said second capacitor for preventing charging of the latter until said predetermined voltage is reached.

3. The combination of claim 2 and wherein an adjusting means coacts with said voltage-regulating means for adjusting the predetermined voltage at which the rate of voltage increase is reduced.

4. The combination of claim 3 and wherein said adjusting means includes a variable resistor connected in the circuit of said second capacitor.

5. The combination of claim 2 and wherein said switching circuit includes a variable resistor having a plurality of settings respectively corresponding to different values of an exposure-determining factor other than light intensity, and said variable resistor determining said trigger voltage for said switching circuit so that only when said variable resistor has a setting calling for a charging voltage at said timing capacitor greater than said predetermined voltage will said voltage-regulating means act to reduce the rate of voltage increase.

6. The combination of claim 5 and wherein said variable resistor has predetermined increments between successive settings thereof and said increments being larger below said predetermined voltage than above said predetermined voltage so that with the smaller increments between said settings at voltage values greater than said predetermined voltage it becomes possible to provide a greater number of settings for said variable resistor above said predetermined voltage.

7. The combination of claim 6 and wherein said switching circuit includes a switching transistor having an emitter selectively connected with said variable resistor at a selected one of said settings thereof.

8. The combination of claim 7 and wherein a junction electrically interconnects said photosensitive means and said timing capacitor, and said switching transistor having a base connected electrically to said junction.

9. The combination of claim 2 and wherein an amplifying transistor is connected between said photosensitive means and said timing capacitor.

10. The combination of claim 2 and wherein a warning means is operatively connected with said timing circuit and switching circuit for automatically indicating when the lighting conditions are beyond the lowest light intensity limit and the highest light intensity limit for making a proper exposure.

References Cited

UNITED STATES PATENTS 3,056,332  10/1962  Beregowitz  95—10 C

SAMUEL S. MATTHEWS, Primary Examiner

R. E. ADAMS, Jr., Assistant Examiner

U.S. Cl. X.R.

95—53 EB